(12) United States Patent
Yantorno et al.

(10) Patent No.: US 7,177,808 B2
(45) Date of Patent: Feb. 13, 2007

(54) METHOD FOR IMPROVING SPEAKER IDENTIFICATION BY DETERMINING USABLE SPEECH

(75) Inventors: Robert E. Yantorno, Havertown, PA (US); Daniel S. Benincasa, Barneveld, NY (US); Stanley J. Wenndt, Rome, NY (US); Brett Y. Smolenski, Schwenksville, PA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 307 days.

(21) Appl. No.: 10/923,157

(22) Filed: Aug. 18, 2004

(65) Prior Publication Data

US 2005/0027528 A1 Feb. 3, 2005

(51) Int. Cl.
*G10L 17/00* (2006.01)
*G10L 15/20* (2006.01)
(52) U.S. Cl. .................. 704/246; 704/233; 704/247
(58) Field of Classification Search ............... 704/233, 704/246–250; 370/201
See application file for complete search history.

(56) References Cited

U.S. PATENT DOCUMENTS

| 5,271,088 A * | 12/1993 | Bahler ................ 704/200 |
| 5,355,431 A * | 10/1994 | Kane et al. ............ 704/226 |
| 5,623,539 A * | 4/1997 | Bassenyemukasa et al. 704/233 |
| 6,522,746 B1 * | 2/2003 | Marchok et al. ........ 704/201 |
| 6,539,352 B1 * | 3/2003 | Sharma et al. ......... 704/249 |
| 2003/0023436 A1 * | 1/2003 | Eide ................... 704/236 |

OTHER PUBLICATIONS

Kizhanatham, "Detection of Cochannel Speech and Usable Speech," Masters Thesis, Temple University, pp. 1-87, May 2002.*
Lovekin et al, "Developing Usable Speech Criteria for Speaker Identification", ICASSP 2001, pp. 421-424, May 2001.*
Shao et al, "Co-channel Speaker Identification Using Usable Speech Extraction Based on Multipitch Tracking," IEEE International Conference on Acoustics, Speech, and Signal Processing, vol. 2, pp. 205-208, 2003.*

* cited by examiner

*Primary Examiner*—David Hudspeth
*Assistant Examiner*—James S. Wozniak
(74) *Attorney, Agent, or Firm*—Joseph A. Mancini

(57) ABSTRACT

Method for improving speaker identification by determining usable speech. Degraded speech is preprocessed in a speaker identification (SID) process to produce SID usable and SID unusable segments. Features are extracted and analyzed so as to produce a matrix of optimum classifiers for the detection of SID usable and SID unusable speech segments. Optimum classifiers possess a minimum distance from a speaker model. A decision tree based upon fixed thresholds indicates the presence of a speech feature in a given speech segment. Following preprocessing, degraded speech is measured in one or more time, frequency, cepstral or SID usable/unusable domains. The results of the measurements are multiplied by a weighting factor whose value is proportional to the reliability of the corresponding time, frequency, or cepstral measurements performed. The measurements are fused as information, and usable speech segments are extracted for further processing. Such further processing of co-channel speech may include speaker identification where a segment-by-segment decision is made on each usable speech segment to determine whether they correspond to speaker #1 or speaker #2. Further processing of co-channel speech may also include constructing the complete utterance of speaker #1 or speaker #2. Speech features such as pitch and formants may be extended back into the unusable segments to form a complete utterance from each speaker.

28 Claims, 8 Drawing Sheets

|  | Weighted k-NN | Decision Trees |
|---|---|---|
| Usable hits | 77.64% | 67.99% |
| Usable miss | 22.36% | 32.01% |
| Unusable hits | 67.99% | 56.59% |
| Unusable miss | 32.01% | 43.41% |

FIGURE 4

METHOD FOR IMPROVING SPEAKER IDENTIFICATION BY DETERMINING USABLE SPEECH

STATEMENT OF GOVERNMENT INTEREST

The invention described herein may be manufactured and used by or for the Government for governmental purposes without the payment of any royalty thereon.

BACKGROUND OF THE INVENTION

This invention relates to detecting segments of usable speech in a speech-degraded environment, and, more specifically, to the detection of usable speech for identifying and separating out a speaker in a common channel where there exist two or more simultaneous speakers and their corresponding speech patterns. Speech is defined as usable speech where an interfering signal (which could be speech or noise) does not significantly degrade the information content of the target speech. The prior art lacks a method and apparatus for making decisions and algorithmic computations to extract usable speech and to identify each of such speakers.

Most signal processing involves processing a signal without concern for the quality or information content of that signal. In speech processing, speech is processed on a frame-by-frame basis, usually only with concern that the frame is either speech or silence. However, knowing how reliable the information is in a frame of speech can be very important and useful. This is where usable speech detection and extraction can play a very important role. The usable speech frames can be defined as frames of speech that contain higher information content compared to unusable frames with reference to a particular application. The prior art lacks a speaker identification system that defines usable speech frames and then determines a method for identifying those frames as usable.

Speaker separation in an environment where multiple speakers speak simultaneously over a common channel has challenged researchers for thirty years. Traditional methods for speaker extraction from a common channel enhance the target (desired) speech or suppress the non-target (undesired) speech, or both. Various features, such as the speaker's voice pitch, have been used to (1) enhance the harmonic components of the target speaker's voice, (2) suppress the harmonic components of the non-target speaker's voice, or (3) simultaneously enhance and suppress the harmonic components of both speakers' voices. These methods then enable one trained in the art to extract a particular speaker's voice from the composite of all speakers' voices on the channel.

There are many drawbacks of these prior-art approaches to speaker separation. First, they have historically treated the entire speech detection process as being co-channel at all times. Though this approach yields results, it is suboptimal. Only one of several speakers may be speaking on the channel, so the other speakers do not interfere with the target speech. In this case, the channel actually contains usable co-channel speech. Results can be obtained in this case only at the expense of performance, efficiency, and accuracy.

Furthermore, the prior art does not discriminate between unusable and usable segments of co-channel speech. Rather, all incoming co-channel speech is processed by either enhancing target speech or suppressing non-target speech. The result is that a segment of usable co-channel speech (i.e., two or more contiguous frames of speech) becomes so degraded that information is lost through processing. Here, efficiency and speed of detection are sacrificed and processing resources wasted.

Historically, the prior art has not examined the structure of co-channel speech as part of the process of speaker detection and extraction. Mid 1970's approaches to speech extraction examined relatively short frames of co-channel speech, about 10 to 30 milliseconds duration, where the target speech was enhanced. Methods to suppress non-target speech developed in the 1980's, but they still processed relatively short (10 to 30 millisecond) co-channel speech frames.

Today co-channel speech detection and extraction combines, through filters, both target speaker enhancement and non-target speaker suppression. Co-channel speech is processed by computer, which yields an output without making any decision about the speech. The prior art takes no advantage of any possible fusion of time, cepstral, and frequency domain attributes of a given sample of speech to identify usable segments.

In an operational environment speech is degraded by many kinds of interferences. The operation of many speech processing techniques are plagued by such interferences. Usable speech extraction is a novel concept of processing degraded speech data. The idea of usable speech is to identify and extract portions of degraded speech that are considered useful for various speech processing systems. Yantorno [1] performed a study on co-channel speech and concluded that the Target-to-Interferer Ratio (TIR) was a good measure to quantify usability for speaker identification. However, the TIR is not an observable value [1] from the co-channel speech data. A number of methods termed usable speech measures which are indicators to the TIR have been developed and studied under co-channel conditions [2, 3, 4, 5, 6]. These measures are used as features in decision fusion systems to make an overall decision [7, 8]. On similar lines the effects of silence removal on the performance of speaker recognition were studied in [9]. In all of the above methods mentioned, usability in speech is considered to be application independent. However the concept of usable speech by definition is application dependent, i.e. usable speech for speech recognition may not be usable for speaker identification and vice versa.

REFERENCES

[1] R. E. Yantorno, "Co-channel speech study, final report for summer research faculty program," Tech. Rep., Air Force Office of Scientific Research, Speech Processing Lab, Rome Labs, New York, 1999.

[2] J. M. Lovekin, K. R. Krishnamachari, and R. E. Yantorno, "Adjacent pitch period comparison (appc) as a usability measure of speech segments under co-channel conditions," IEEE International Symposium on Intelligent Signal Processing and Communication Systems, pp. 139–142, November 2001.

[3] N. Chandra and R. E. Yantorno, "Usable speech detection using modified spectral autocorrelation peak to valley ration using the lpc residual," 4th IASTED International Conference Signal and Image Processing, pp. 146–150, 2002.

[4] N. Sundaram, A. N. Iyer, B. Y. Smolenski, and R. E. Yantorno, "Usable speech detection using linear predictive analysis—a model-based approach," IEEE International Symposium on Intelligent Signal Processing and Communication Systems, ISPACS, 2003.

[5] A. N. Iyer, M. Gleiter, B. Y. Smolenski, and R. E. Yantorno, "Structural usable speech measure using lpc residual," IEEE International Symposium on Intelligent Signal Processing and Communication Systems, ISPACS, 2003.

[6] Y. Shao and D-L. Wang, "Co-channel speaker identification using usable speech extraction based on multipitch tracking," IEEE International Conference on Acoustics, Speech, and Signal Processing,, vol. 2, pp. 205–208, 2003.

[7] B. Y. Smolenski and R. E. Yantorno, "Fusion of usable speech measures using quadratic discriminant analysis.," IEEE International Symposium on Intelligent Signal Processing and Communication Systems, ISPACS 2003, 2003.

[8] J. K. Shah, B. Y. Smolenski, and R. E. Yantorno, "Decision level fusion of usable speech measures using consensus theory," IEEE International Symposium on Intelligent Signal Processing and Communication Systems, ISPACS 2003, 2003.

[9] J-K. Kim, D-S. Shin, and M-J. Bae, "A study on the improvement of speaker recognition system by voiced detection," 45th Midwest Symposium on Circuits and Systems, MWSCAS, vol. III, pp. 324–327, 2002.

[10] F. K. Soong, A. E. Rosenberg, and B-H. Juang, "Report: A vector quantization approach to speaker recognition," AT&T Technical Journal, vol. 66, pp. 14–26, 1987.

[11] R. O. Duda, P. E. Hart, and D. G. Stork, Pattern Classification, Wiley, New York, 2nd edition edition, 2001.

[12] J. M. Lovekin, R. E. Yantorno, K. R. Krishnamachari, D. B. Benincasa, and S. J. Wenndt, "Developing usable speech criteria for speaker identification," IEEE, International Conference on Acoustics and Signal Processing, pp. 424–427, May 2001.

[13] D. G. Childers, Speech Processing and Synthesis Toolboxes, Wiley, New York, 1999.

[14] R. Quinlan, "Discovering rules from large collections of examples: a case study," Expert Systems in the Microelectronic Age, Edinburgh University Press, Edinburgh, pp. 168–201, 1979.

OBJECTS AND SUMMARY OF THE INVENTION

It is therefore an object of the present invention to provide a method that overcomes the prior art's limitations in identifying a speaker in a degraded (noisy) environment.

Another object of the present invention is to preprocess speech so as to determine and distinguish usable speech segments from unusable speech segments.

Still another object of the present invention is to determine usable and unusable speech segments by extracting and analyzing certain speech classifiers and by determining the similarity of speech segments to a speech model.

Yet another object of the present invention is to process speech so as to enhance a target speaker, suppress a non-target speaker, or suppress the speech degradation that coexists with the target speech, so as to detect usable speech in a speech-degraded environment.

A further object of the present invention is to provide a method that decides, using time, cepstral, frequency and SID-usable/unusable domains in any combination, which segments of degraded speech are usable and to extract those usable speech segments.

Still a further object of the present invention is to provide a method that identifies which usable speech segment is associated with which speaker in a co-channel speech environment.

Still yet another object of the present invention is to provide a method that reconstructs the speech of each speaker in a co-channel speech environment from the unusable co-channel speech frames that belong to each speaker.

Briefly stated, a method is provided for improving speaker identification by determining usable speech in speech-degraded environments. Speech-degraded environments include co-channel, speech-plus-noise, multipath, distorted speech, echo, quantization noise, and finite bandwidth environments. Degraded speech segments are preprocessed in a speaker identification process so as to produce SID-usable and SID-unusable speech segments from which speech features are extracted and upon analysis thereof, optimum classifiers are determined. The aforesaid classification is aided by comparison with a trained speaker model.

Degraded speech is measured in one or more time, frequency, cepstral or SID-usable/unusable domains. A weighting factor, whose value is proportional to the reliability of the corresponding time, frequency, cepstral or SID-usable/unusable measurements performed, is applied to the results of the measurements. The measurements are fused as information, and usable speech segments are extracted for further processing. Such further processing of co-channel speech may include speaker identification where a segment-by-segment decision is made on each usable speech segment to determine whether they correspond to speaker #1 or speaker #2. Further processing of co-channel speech may also include constructing the complete utterance of speaker #1 or speaker #2. Speech features, such as pitch and formants extracted from abutting usable frames of speech, may be extended back into the unusable segments and used to reconstruct the speech to form a complete utterance from each speaker.

Measurements of the co-channel speech segments are made in at least one of the time, cepstral, frequency or SID-usable/unusable domains, or in any combination of them, and these measurements are in turn weighted. The speech has several distinctive features, any one of which can be measured, each in many different ways. Some of the features are: periodicity within the time domain (measured by autocorrelation and modified covariance techniques); Fourier transform analysis (which can measure in the frequency domain the harmonically-related energy of the speech); and spectral autocorrelation and cyclostationarity of the Fourier representation (which can measure the harmonically-related energy). Weighted measurements are fed into a process that decides which segments are usable. The usable speech segments are then extracted for further processing.

Identifying the speaker and sorting by speaker can be carried out for each usable speech segment. A decision process that employs a set of top two speaker choices sorts usable speech segments associated with the target and non-target speakers.

The complete utterance of co-channel speakers can be reconstructed by analyzing speech features such as pitch and formants. Pitch and formants are extracted from the beginning and end frames of usable speech segments and extended back into the unusable abutting frames. Conventional speech recognition tools can thereafter reconstruct the complete utterance of the speakers.

According to an embodiment of the present invention, method for improving speaker identification by determining usable speech comprises the steps of: preprocessing speech by inputting degraded speech segments into a speaker identification process so as to produce SID-usable and SID-unusable speech segments; extracting SID-usable and SID-unusable features from said SID-usable and SID-unusable speech segments, respectively; and analyzing said SID-usable and SID-unusable features so as to determine optimum classifiers for the detection of said SID-usable and said SID-unusable speech segments.

According to a feature of the present invention, method for improving speaker identification by determining usable speech comprises the steps of: measuring a unit of degraded speech by at least one of: obtaining at least one time-domain measurement from the unit; obtaining at least one frequency-domain measurement from the unit; obtaining at least one cepstral-domain measurement from the unit; obtaining at least one SID-usable/unusable measurement from the unit; applying a weighting factor to each of the at least one time-domain measurement; the at least one frequency-domain measurement, the at least one cepstral-domain measurement and the at least one SID-usable/unusable measurement, thereby obtaining at least one weighted domain measurement; fusing information derived from the at least one weighted domain measurement; determining from the information which speech segments within the unit are usable and which are unusable; and extracting those speech segments determined to be usable.

The above and other objects, features and advantages of the present invention will become apparent from the following description read in conjunction with the accompanying drawings, in which like reference numerals designate the same elements.

BRIEF DESCRIPTION OF THE DRAWINGS

FIG. 4 depicts the performance of respective k-NN and decision tree systems

DETAILED DESCRIPTION OF THE INVENTION

Vector Quantization

The present invention uses a vector quantization classifier to build the feature space and to perform speaker classification [10]. The LPC-Cepstrum is used as features with the Euclidean distance between test utterances and the trained speaker models as the distance measure. A vector quantizer maps k-dimensional vectors in the vector space $R_k$ into a finite set of vectors $Y=\{y_i: i=1, 2, \ldots, N\}$. Each vector $y_i$ is called a codeword and the set of all the codewords is called a codebook. In this system the 14th order LPC-Cepstral feature space is clustered into 128 centroids during the training stage which is referred as the codebook.

Study of Distances from Speaker Models

Figure 1:
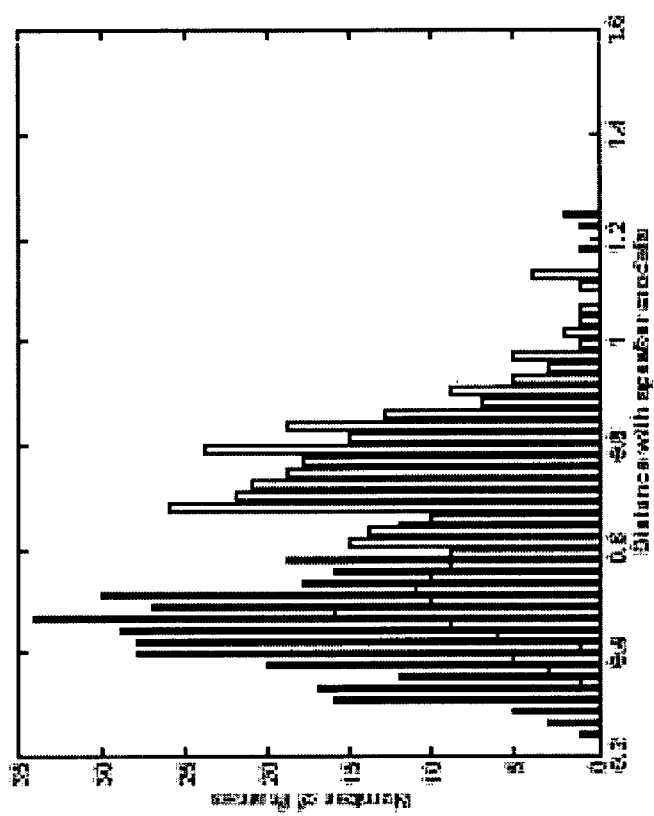
FIG. 1 depicts the distribution distances of speech frame features from a trained speaker model

Referring to FIG. 1, consider the testing stage in which the test utterance is divided into 'n' frames and the Euclidean distance of the features of 'n' frames with 'm' trained speaker models is determined. For each speaker model, the minimum distance obtained from the codewords is considered as the distance from the model. Without loss of generality, consider a system trained with two speakers and tested on one of the speakers.

This two speaker system provides a simple approach to better understanding how the system functions and to be able to interpret the results due to its simplicity. One can expect to have two distributions of the distances with significant difference in the expected values as shown (see FIG. 1). The distribution with a lower mean value corresponds to the identified speaker. It should be pointed that there exists a good number of frames which have equal distances for each model. It is easy to realize that such frames contribute minimally to the speaker identification process, and might even degrade the operation with multi-speaker trained system!

Usable Speech Definition

Figure 2:
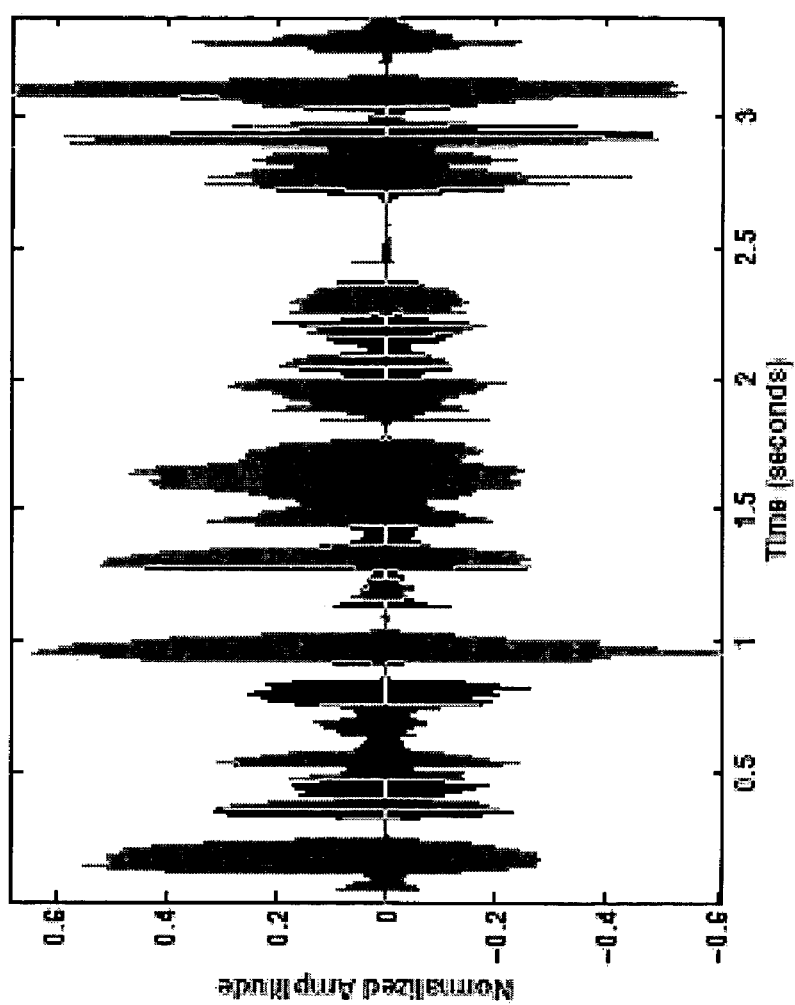
FIG. 2 depicts usable versus unusable speech data

Referring to FIG. 2, with the knowledge of the frame distances from the speaker models, a frame of speech can be defined as usable in different ways. The simplest method is to look at the minimum of the distances from different speaker models, and if it corresponds to the correct speaker, the frame can be termed as usable. From the classification matrix the speech frames are categorized into two classes and are labeled as "1" (usable) and "0" (unusable). The labeling is done based on the following criterion—

$$\phi_m(i) = \begin{cases} 1, & \min(D_i) = d(m, i) \\ 0, & \min(D_i) \neq d(m, i) \end{cases}$$

where m is the speaker index, i is the frame index, $D_i$ is the vector consisting of distance between frame i and the trained speaker models and d is the classification matrix. In other words, the criterion can be cited as: a frame of speech is considered to be usable if it yields the smallest distance measure with the correct speaker and hence aids in the speaker identification operation, else it is considered unusable. One would expect the performance of speaker identification would be higher if only the usable speech frames are identified in a preprocessor unit and fed into the speaker identification system. FIG. 2 shows the labeled speech data. The data labeled as usable is represented in gray and the unusable is represented in black. Note that it is hard to visually draw any conclusions regarding the two classes of data.

Speaker Identification Performance Metric

Figure 3:
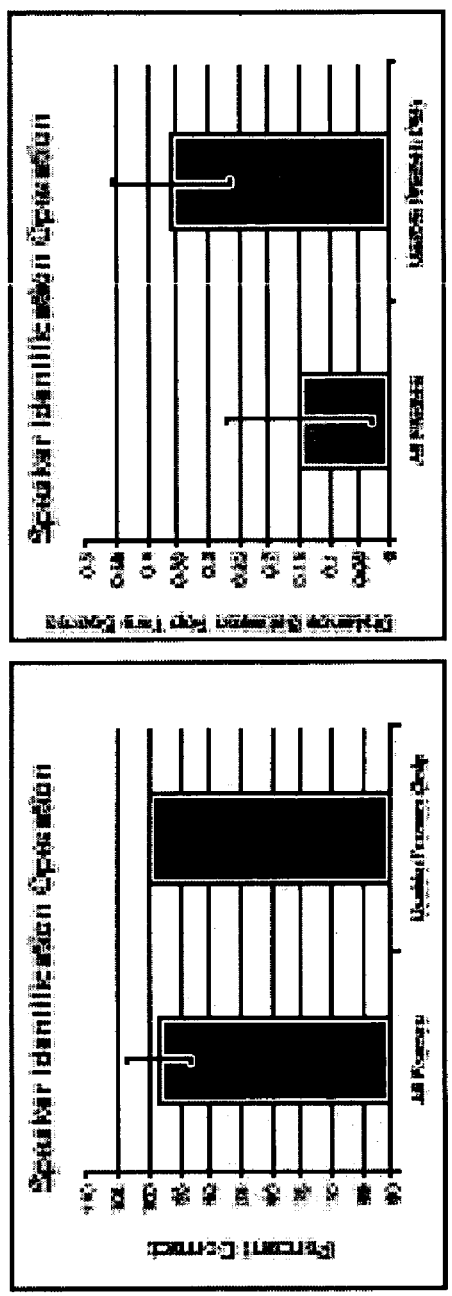
FIG. 3a depicts the percentage accuracy in speaker identification
FIG. 3b depicts difference in distance between the best two speaker selected

Referring to FIG. 3a and FIG. 3b, the speaker identified corresponds to the model which has the smaller mean value $\mu_c$ of the distances. If the next best chosen model has a mean value of $\mu_{c-1}$, the difference between the mean values of the best two speaker models chosen by test speech data serves as a metric to quantify the speaker identification performance.

$$P_1 = \mu_c - \mu_{c-1}$$

It would be evident that the speaker identification performance had improved if the value of the metric is higher. The performance of speaker identification can also be quantified by comparing the amount of speech data $P_2$ (sec) required for correct identification, i.e., if less speech data is needed for good identification.

To realize these performance metrics, speaker identification experiments were performed with a priori knowledge of the speakers. The speaker identification system was trained on two speakers and tested on one of the speakers resulting in a collection of usable frames. The defined SID-usable data was used to test the speaker identification performance. The performance was compared for two scenarios, 1) utterances having a length equal 2 seconds and 2) usable speech segments, of average length 1.4 seconds. Data from the TIMIT database with twenty-four speakers was used for the speaker identification operation experiments and the results were analyzed and are presented in FIG. 3a and FIG. 3b. In this figure speaker identification performance compared with speech data and extracted usable frames. FIG. 3a depicts the percentage accuracy in speaker identification and FIG. 3b depicts the difference in distance ($P_1$) between the best two speakers selected. Note that the black vertical lines are standard error bars.

The system was successively trained with two utterances accounting all combinations of male/female speakers and tested on a total of 384 utterances. The values represented in the chart are the average values over all the test utterances.

Again, observing FIG. 3a and FIG. 3b it can be noted that by using only usable speech segments, the speaker identification system has higher performance with respect to both the metrics based on five different pieces of information. First, the average difference between the best two scores is higher with usable speech case. Second, the amount of usable speech was approximately 30% less than the all frames data without the system's performance being compromised. Third, the standard deviation of the usable speech difference scores was smaller, indicating a higher confidence level in the identified speaker. Fourth, for the usable speech case the percent correct was 100% versus 94% for the all frames case. Fifth, the standard error for the percent correct is zero as compared with for all frames condition. Therefore, it can be concluded that using only usable speech improves the speaker identification performance significantly.

Usable Speech Identification

In an operational environment it will be essential that there must be some way to identify SID-usable speech frames prior to being input into the speaker identification process. Two methods to accomplish this are presented here. The weighted k-NN is used as a blind system performing classification. The use of speech features with decision tree algorithms is motivated by the fact that certain classes of speech contain more information compared to the others.

Weighted k-NN Pattern Classifier

The k-Nearest Neighbor rule [11] is a very intuitive method that classifies unlabelled samples based on their similarity with samples in the training set. The a posteriori class probabilities $P(\omega_i|x)$ of test vector x for the usable and unusable classes $\{\omega_i; i=1,2\}$ is determined by $$P(\omega_i | x) = \frac{1}{d_i} \cdot \frac{k_i}{k} \cdot p(\omega_i)$$

That is, the estimate of the a posteriori probability that x belongs to class $\omega_i$ is merely the fraction $k_i$ of the samples within the k-nearest neighbors, that are labeled $\omega_i$ and weighed inverse proportionally to the average similarity measure $d_i$ with each class samples. Further it is weighed with respect to the class probabilities $p(\omega_i)$. Usually for an even class problem, k is chosen to be odd to avoid a clash. The k-NN rule relies on the proximity measure and the Euclidean distance, which is between the 14th order LPC-Cepstrum coefficients of the test pattern and the training templates was considered.

The value of k was chosen as 9, as it resulted in reasonable classification results.

Decision Trees

Prior studies [12] have shown unvoiced frames of speech do not contribute significantly to speaker identification. The present invention determines if there exists a relationship between speech classes and their contribution to speaker identification. For example, some classes of speech might not help the speaker identification process such as nasals which have zeros and hence would not give satisfactory results in speaker identification, because the features used by the SID are based on the autoregressive. Here, the present invention identifies speech classes from speech data and study the relation between speech classes and their contribution to speaker identification.

Speech Feature Detectors

Acoustic feature detection is the search for different (acoustic) features. Examples of acoustic features include voicing, nasality and sonorance. While acoustic features are used to differentiate between various segment categories, for example, nasality may indicate the presence of nasal, or it may indicate the presence of nasalized vowel. Eight feature detectors were used in this research, which includes sonorant, vowel, nasal, semivowel, voice-bar, voiced fricative, voiced stop and unvoiced stop. Together with the feature detectors, spectral flatness value was also considered which gives a voiced/unvoiced decision. The computation of most feature detectors is based on a volume function. The volume function represents the quantity analogous to loudness, or acoustic volume of the signal at the output of a hypothetical band-pass filter. The volume function can be computed using the following equation [13].

$$VF(i) = \frac{1}{N_i} \sqrt{\sum_{m=A}^{B} |H_i(e^{j\pi \frac{m}{256}})|^2}$$

where i is the current frame index, $N_i$ is the number of samples, A is the index of low cutoff frequency and B is the high cutoff frequency. Each feature detection algorithm computes a feature value, which is a ratio of volume functions computed in two frequency bands. The feature values are converted into a decision based on fixed thresholds to indicate the presence of the corresponding feature in a given frame of speech [13].

With the feature decisions, the class can be classified through a sequence of questions, in which the next question asked depends on the answer to the current question. This approach is particularly useful for such non-metric data, since all of the questions can be asked in a "true/false" and does not require any notion of a distance measure. Such algorithms build a decision tree based on the entropy or the information content of each feature. The traditional C4.5 algorithm [14] was used for this work.

Experiments and Results

A subset of speech data from the TIMIT database was used for all experimentation involving the present invention. The experiments were designed to use all the speech files for each speaker. The database contains ten utterances for each speaker. Forty eight speakers were chosen spanning all the dialect regions with equal number of male and female speakers. Of the ten utterances, four utterances were used for training the speaker identification system. Then the system was tested on the remaining six utterances and the corresponding classification matrices were saved. The speech data were labeled using the classification matrix and equation presented herein for frames of speech, 40 ms long.

The labeled data from the forty-eight speakers was used to train and test the preprocessing systems. A subset of thirty-six speakers were used to train the k-NN pattern classifier and the decision tree algorithms. The data from the rest twelve speakers were used for testing and performance evaluation of the preprocessing systems.

Referring to FIG. 4, the performance of the respective k-NN and decision tree systems is tabulated wherein a hit is defined as the number of usable frames identified as correctly by the method and a miss is defined as the number of usable frames declared as unusable.

Speaker Identification Improvement

The next step in using the usable speech concept for speaker identification is to evaluate the speaker identification performance with the preprocessor unit. The training and testing data used for this purpose are the same as described in the Experiments and Results presented herein. However, the a priori knowledge of the speaker's identity is ignored and the usable speech frames are extracted. The speaker identification system was successively trained using four training utterances and tested with utterances from one of the speakers. The result of correct identification of speakers with the weighted k-NN scheme was 97% and with the decision tree scheme was 95%. These results can be compared to 94% correct identification without the preprocessor system.

DETAILED DESCRIPTION OF THE PREFERRED EMBODIMENT

Figure 5:
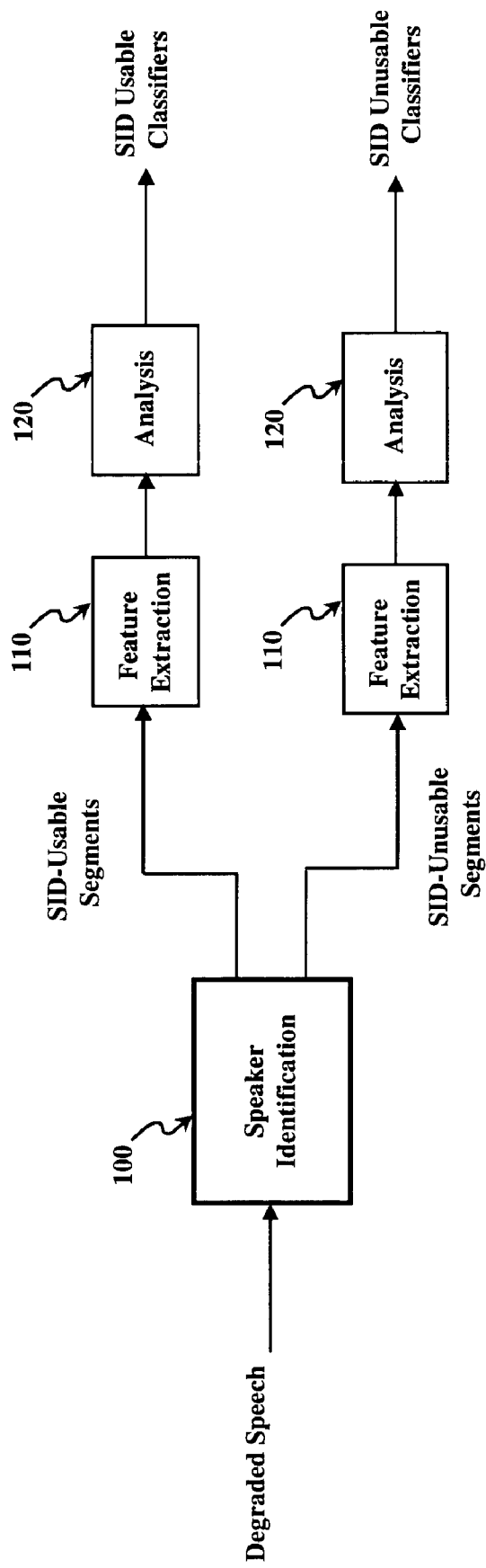
FIG. 5 depicts a block diagram of the preprocessing and feature extraction, analysis and classification process of the present invention

Referring to FIG. 5, degraded speech is input into a speaker identification process 100 to determine which speech segments are usable and which are unusable or SID-usable and SID-unusable. This determination of SID-usable and SID-unusable serves as a preprocessing step for later feature extraction, usable segment extraction, speaker identification and speech reconstruction. In the prior art, TIR or SNR have been used as a measure of speech segment usability, but the present invention recognizes the prior art approach as being arbitrary. Since by definition "usable" speech is context dependent, the present invention utilizes the same system that will later process speech, to determine in the first instance, which speech segments are "usable".

Still referring to FIG. 5, a feature extraction 110 and an analysis 120 is performed on SID-usable and SID-unusable segments, so as to extract SID-usable and SID-unusable features, respectively. Once the SID-usable and SID-unusable speech segments have been extracted, an analysis is performed to determine which features are best for determining SID-usable and/or SID-unusable speech segments. Preliminary experiments have shown that additional features, different from the initially identified time, frequency and cepstral domain features, are possible candidates for SID-usable and SID-unusable speech detection. These additional features include the weighted k-NN (Nearest Neighbor) classifier and the Volume Function/Decision Tree classifier. Neither of the two latter approaches have been provided by or otherwise identified in the prior art. It should also be noted that the extraction and analysis of other features is also possible, for example classifiers can be obtained for the SID unusable speech. What is significant about this approach, i.e., using the system to identify what is usable and what is unusable, is that the present invention is not forcing the classifiers but rather is allowing the process to define what the best classifier is. Therefore, the output of FIG. 5 is used to determine which classifiers provide the best results in detecting SID-usable and/or SID-unusable speech.

Figure 6:
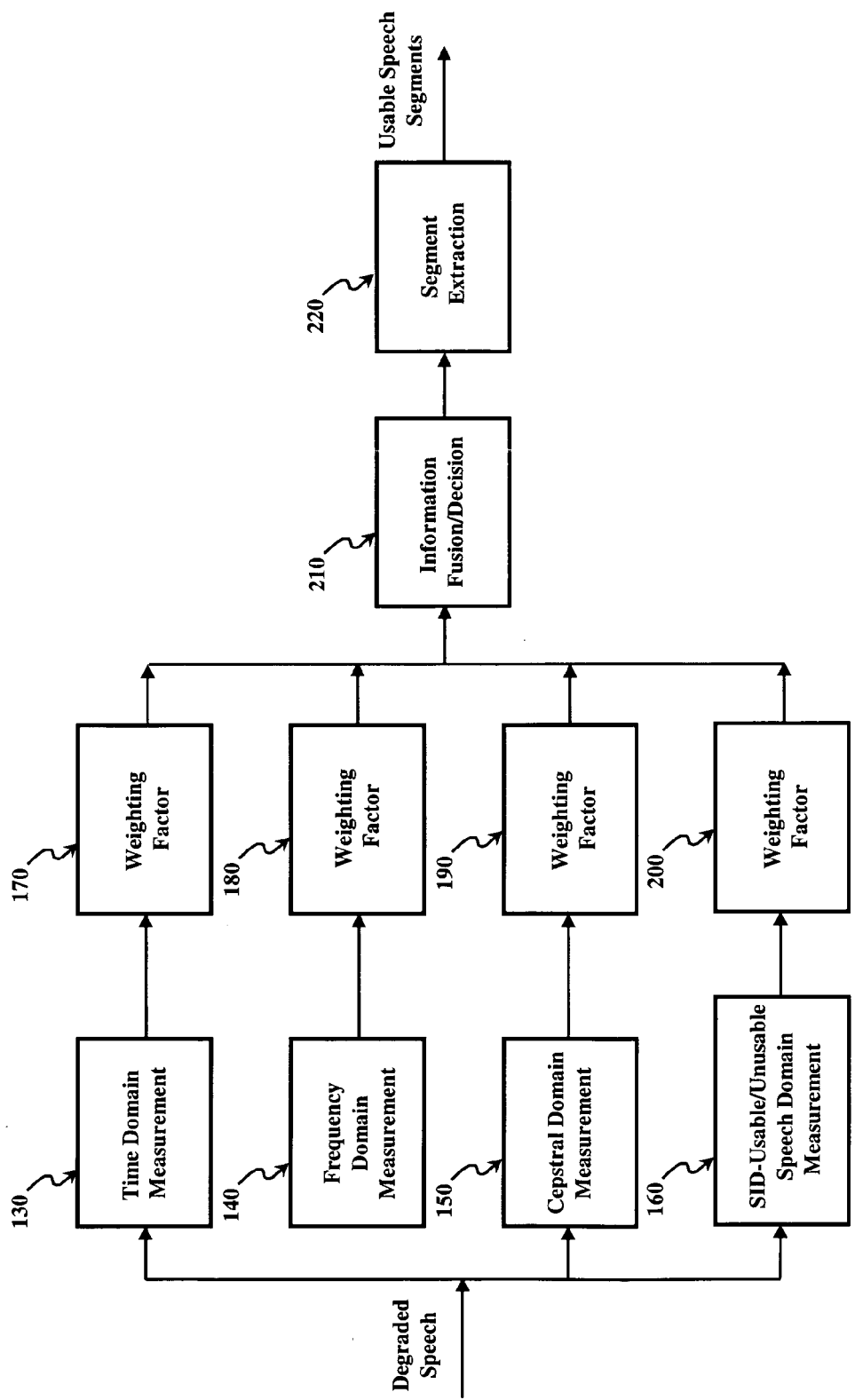
FIG. 6 depicts a block diagram of the process of extraction usable speech segments as a result of weighting and fusing the information from time, frequency, cepstral and SID-usable and SID-unusable domain measurements.

Referring to FIG. 6, degraded speech is simultaneously measured in at least one of a time domain, a frequency domain, a cepstral domain and a usable/unusable speech domain. The input degraded speech is measured in "speech frames" of a duration that varies between 20 and 60 milliseconds. These measurements determine the periodic or structural nature of the speech frames, including the harmonic structure of the speech segment. Weighting factors 170, 180, 190 and 200 are applied respectively to a time domain measurement 130, a frequency domain measurement 140, a cepstral domain measurement 150 and a usable/unusable speech domain measurement 160 to form weighted measurements. The weighted measurements are then fed to an information fusion/decision process 210 where a decision is made, based on a weighted sum of measurements 130, 140, 150 and 160, whether that particular segment of speech is usable. A segment extraction process 220 passes only those frames of speech identified as "usable" by information fusion/decision process 210.

Time domain measurement 130 comprises measuring the periodicity or structure within a frame of speech. Periodicity can be measured, for example, both by autocorrelation and by modified covariance during time domain measurement 130. Cepstral domain measurement 150 comprises a fast Fourier transform ("FFT") of the time-domain speech frame, followed by a conversion to absolute value, which is in turn followed first by a conversion to a base-10 logarithm and then by an inverse Fourier transform. Cepstral domain measurement 150 yields harmonic and periodic structure of the speech frame. Frequency domain measurement 140 comprises measuring the amount of energy in harmonically related frequency components in the magnitude spectrum of the Fourier transform of the input segment of speech. Two of the many possible methods to measure this structure include both spectral autocorrelation and the cyclostationarity of the signal. Usable/unusable speech domain measurement 160 comprises feature extraction and analysis on SID-usable and SID-unusable segments including the weighted k-NN (Nearest Neighbor) classifier and the Volume Function/Decision Tree classifier. Once the structure of each harmonic component is measured, weighting factors 170, 180, 190 and 200 are applied respectively to each resulting value to form a weighted measurement. Each weighting factor is proportional to the reliability of time domain measurement 130, frequency domain measurement 140, cepstral domain measurement 150 and the usable/ unusable speech domain measurement 160 relative to each other. The weighted measurements are fed to information fusion/decision process 210 where they are summed to produce a single decision whether or not the segment of speech is usable. Segment extraction process 220 outputs only those frames of speech that have been identified as "usable" by information fusion/decision process 220.

Figure 7:
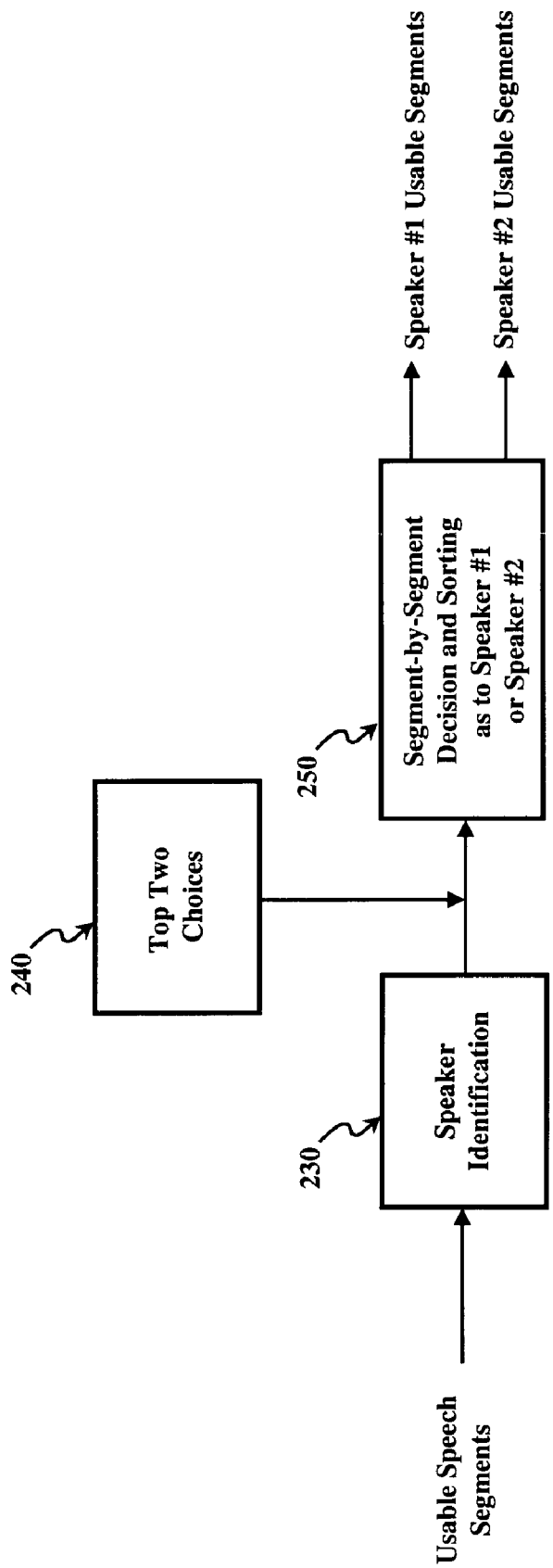
FIG. 7 depicts a block diagram of the process for associating usable speech segments and associating them with a particular speaker.

Referring to FIG. 7, in a co-channel speaker environment, identifying a speaker and sorting by speech segments by speaker includes performing a speaker identification 230 on an iterative, segment-by-segment decision and sorting 250 whether the identified speaker is speaker #1 or speaker #2. There are several types of processes identified in the open literature that could be employed to identify a speaker based on short segments of speech. Speaker identification 230 receives the usable speech segments generated by segment extraction process 220 (see FIG. 6). This step identifies target and non-target speakers and sorts usable speech segments as belonging to either the target or the non-target speaker. A set of top two choices 240 is fed into the decision process. Ideally, top two choices 240 comprise the target and non-target speaker and may be obtained from the entire utterance as well as from speech segments from a limited amount of training data. One may also test all combinations of segments and then choose the two sets of segments that represent top two choices 240.

Figure 8:
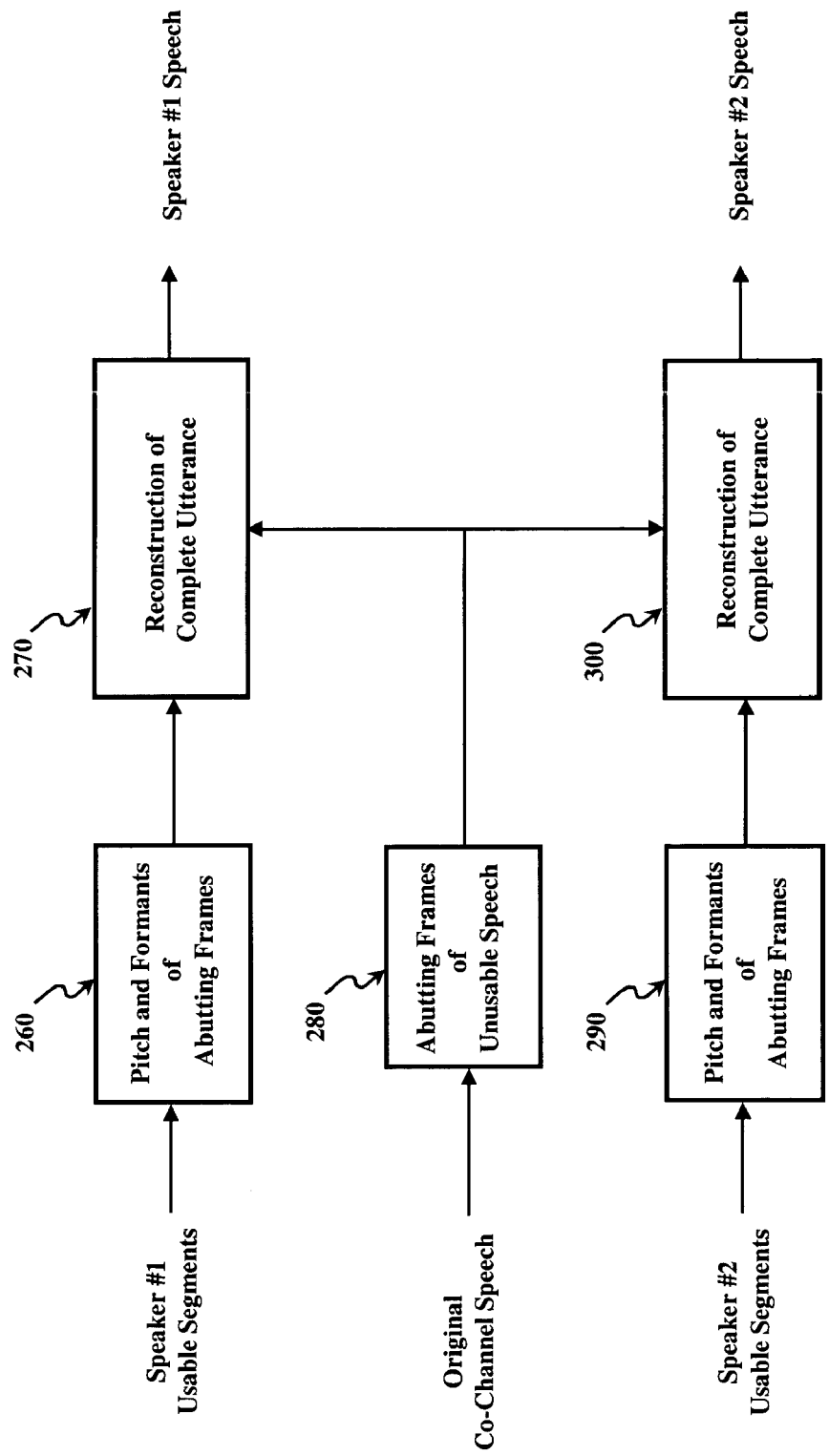
FIG. 8 depicts a block diagram of the process for reconstructing a particular speaker's speech from usable speech segments associated with that speaker.

Referring to FIG. 8, speech reconstruction includes extracting pitch and formants from the beginning and end of a segment of usable speech 260, 290 from each speaker, extending this information into abutting frames of unusable speech 280, and reconstructing a complete utterance 270, 300 for each speaker.

Speaker #1 and speaker #2 segments of usable speech generated by an earlier process (see FIG. 7), are fed into the process shown in FIG. 8. Information from the beginning and ending frames of segments of usable speech is extrapolated into abutting frames of unusable speech 280. The information extracted includes pitch and formants, where we assume that neither of these parameters changes drastically from frame-to-frame. This assumption is generally true. Following the extraction of information, the pitch and formants are extended backward and forward into the abutting frames of unusable speech 280 from the co-channel. A complete utterance from each speaker is reconstructed 270, 300 from the segments of speech that have significant co-channel interference and the usable segments from each speaker. Traditional speech recognition tools construct words from these segments.

While the preferred embodiments have been described and illustrated, be it known and understood that the present invention is not limited to those precise embodiments described herein, and that various substitutions, equivalents, adaptations and modifications of the invention may be made thereto by those skilled in the art without departing from the spirit and scope of the invention as defined by the appended claims. Accordingly, it is to be understood that the present invention has been described by way of illustration and not limitation.

What is claimed is:

1. A method for improving speaker identification (SID) in noisy environments, comprising the steps of:
preprocessing speech by inputting degraded speech segments into a speaker identification process so as to produce SID-usable and SID-unusable speech segments;
extracting SID-usable and SID-unusable features from said SID-usable and SID-unusable speech segments respectively; and
analyzing said SID-usable and SID-unusable features so as to determine optimum classifiers for the detection of said SID-usable and said SID-unusable speech segments;
wherein said step of preprocessing further comprises the step of determining the distance of each of said input degraded speech segments from a particular speaker model and;
wherein said step of determining the distance of each of said input degraded speech segments from a particular speaker model further comprises computing a classification matrix $$\phi_m(i) = \begin{cases} 1, & \min(D_i) = d(m, i) \\ 0, & \min(D_i) \neq d(m, i) \end{cases}$$

where m is the speaker index, i is the frame index, $D_i$ is the vector consisting of distance between frame i and the trained speaker models and d is the classification matrix;
wherein said input degraded speech segments are labeled "1" corresponding to SID-usable if it yields the smallest distance measure from the correct speaker model; and
wherein said input degraded speech segments are labeled "0" otherwise, corresponding to SID-unusable.

2. Method of claim 1, further comprising the step of determining the performance $P_1$ of said speaker model, wherein $$P_1 = \mu_c - \mu_{c-1}$$

and wherein
$\mu_c$ is the mean distance from said speaker model;
a minimum value of $\mu_c$ indicates that a speaker has been identified by a corresponding said speaker model; and
$\mu_{c-1}$ is mean distance from the next best said speaker model.

3. Method of claim 1, wherein said step of preprocessing further comprises classifying unlabelled said speech segments using a weighted k-NN pattern classifier, wherein the a posteriori class probabilities $P(\omega_i|x)$ of test vector x for the usable and unusable classes $\{\omega_i; i=1,2\}$ is determined by $$P(\omega_i | x) = \frac{1}{d_i} \cdot \frac{k_i}{k} \cdot p(\omega_i)$$

where $\omega_i$ is the usable and unusable classes, $d_i$ is the average similarity measure, and where $k_i$ are the nearest neighbors.

4. Method of claim 3, wherein k is an odd numerical value.

5. Method of claim 4, wherein k has a numerical value of 9.

6. Method of claim 1, wherein said step of preprocessing further comprises computing a decision tree for speech features of said speech segments, wherein said speech features are converted into a decision based upon fixed thresholds which indicate the presence of a corresponding said speech feature in a given said speech segment;

wherein said speech features are selected from the group of speech features consisting of sonorant, vowel, nasal, semivowel, voice-bar, voiced-fricative, voiced stop, unvoiced-stop and spectral flatness; and wherein said step of computing a decision tree further comprises a step of computing a volume function VF(i) for detecting said speech features, where $$VF(i) = \frac{1}{N_i} \sqrt{\sum_{m=A}^{B} |H_i(e^{j\pi \frac{m}{256}})|^2}$$

and where i is the current frame index, $N_1$ is the number of samples, A is the index of low cutoff frequency and B is the high cutoff frequency.

7. Method of claim 6, further comprising method for measuring a unit of degraded speech by at least one of:
obtaining at least one time-domain measurement from said unit;
obtaining at least one frequency-domain measurement from said unit;
obtaining at least one cepstral-domain measurement from said unit; and
obtaining at least one said SID-usable or said SID-unusable domain measurement from said unit;
applying a weighting factor to each of said at least one time-domain measurement; said at least one frequency-domain measurement, said at least one cepstral-domain measurement and said at least one SID-usable or SID-unusable domain measurement thereby obtaining at least one weighted domain measurement;
fusing information derived from said at least one weighted domain measurement;
determining from said information which speech segments within said unit are usable and which are unusable; and
extracting those speech segments determined to be usable.

8. The method of claim 7 wherein said speech-degraded environment is a co-channel speech environment, further comprising the steps of: identifying a target speaker #1 and a non-target speaker #2 for each of said speech segments determined to be usable; inputting a set of top two choices for said speaker #1 and said speaker #2 ; deciding whether said speech segments determined to be usable are from said speaker #1 or from said speaker #2; sorting said speech segments determined to be usable into those associated with said speaker #1 and those associated with said speaker #2; and repeating said step of identifying, said step of inputting, said step of deciding, and said step of sorting.

9. The method of claim 8, further comprising the steps of:
extracting pitch and formants from abutting frames of said usable speech segments associated with said speaker #1 and said usable speech segments associated with said speaker #2;
extending said step of extracting pitch and formants backward and forward into abutting co-channel frames of said unusable speech segments associated with said speaker #1 and said unusable speech segments associated with said speaker #2; and
reconstructing a complete utterance of speaker #1 and of speaker #2 from said abutting co-channel frames of said unusable speech.

10. The method of claim 8 wherein said speech-degraded environment is a speech-plus-noise environment.

11. The method of claim 8 wherein said speech-degraded environment is a multipath speech environment.

12. The method of claim 8 wherein said speech-degraded environment is a quantization noise speech environment.

13. The method of claim 8 wherein said speech-degraded environment is a finite bandwidth distortion speech environment.

14. The method of claim 8 wherein said speech-degraded environment is an echo distortion speech environment.

15. Apparatus for improving speaker identification (SID), comprising:
means for preprocessing degraded speech segments using a speaker identification apparatus so as to produce SID-usable and SID-unusable speech segments;
means for extracting SID-usable and SID-unusable features from said SID-usable and SID-unusable speech segments, respectively; and
means for analyzing said SID-usable and SID-unusable features so as to produce optimum classifiers for the detection of said SID-usable and said SID-unusable speech segments;
wherein said means for preprocessing further comprises means for determining the distance of each of said input degraded speech segments from a particular speaker model; and
wherein said means for determining the distance of each of said input degraded speech segments from a particular speaker model further comprises means for computing a classification matrix $$\phi_m(i) = \begin{cases} 1, & \min(D_i) = d(m, i) \\ 0, & \min(D_i) \neq d(m, i) \end{cases}$$

where m is the speaker index, i is the frame index, $D_i$ is the vector consisting of distance between frame i and the trained speaker models and d is the classification matrix;
wherein said input degraded speech segments are labeled "1" corresponding to SID-usable if it yields the smallest distance measure from the correct speaker model; and
wherein said input degraded speech segments are labeled "0" otherwise, corresponding to SID-unusable.

16. Apparatus of claim 15, further means for determining the performance $P_1$ of said speaker model, wherein $$P_1 = \mu_c - \mu_{c-1}$$

and wherein
$\mu_c$ is the mean distance from said speaker model;
a minimum value of $\mu_c$ indicates that a speaker has been identified by a corresponding said speaker model; and
$\mu_{c-1}$ is mean distance from the next best said speaker model.

17. Apparatus of claim 15, wherein said means for preprocessing further comprises means for classifying unlabelled said speech segments using a weighted k-NN pattern classifier, wherein the a posteriori class probabilities $P(\omega_i|x)$ of test vector x for the usable and unusable classes $\{\omega_i; i=1,2\}$ is determined by $$P(\omega_i | x) = \frac{1}{d_i} \cdot \frac{k_i}{k} \cdot p(\omega_i)$$

where $\omega_i$ is the usable and unusable classes, $d_i$ is the average similarity measure, and where $k_i$ are the nearest neighbors.

18. Apparatus of claim 17, wherein k is an odd numerical value.

19. Apparatus of claim 18, wherein k has a numerical value of 9.

20. Apparatus of claim 15, wherein said means for pre-processing further comprises means for computing a decision tree for speech features of said speech segments, wherein said speech features are converted into a decision based upon fixed thresholds which indicate the presence of a corresponding said speech feature in a given said speech segment;
   wherein said speech features are selected from the group of speech features consisting of sonorant, vowel, nasal, semivowel, voice-bar, voiced-fricative, voiced stop, unvoiced-stop and spectral flatness; and
   wherein said means for computing a decision tree further comprises means for computing a volume function VF(i) for detecting said speech features, where $$VF(i) = \frac{1}{N_i} \sqrt{\sum_{m=A}^{B} |H_i(e^{j\pi \frac{m}{256}})|^2}$$

and where i is the current frame index, $N_i$ is the number of samples, A is the index of low cutoff frequency and B is the high cutoff frequency.

21. Apparatus of claim 20, further comprising means for obtaining measurements from a unit of degraded speech, said means being effective for obtaining from said unit at least one of:
   at least one time-domain measurement;
   at least one frequency-domain measurement;
   at least one cepstral-domain measurement;
   obtaining at least one said SID-usable or said SID-unusable domain measurement from said unit;
   means for applying a weighting factor to each of said at least one time-domain measurement; said at least one frequency-domain measurement, said at least one cepstral-domain measurement and said at least one SID-usable or SID-unusable domain thereby obtaining at least one weighted domain measurement;
   means for fusing information derived from said at least one weighted domain measurement;
   means for determining from said information which speech segments within said unit are usable and which are unusable; and
   means for extracting those speech segments determined to be usable.

22. Apparatus of claim 21 wherein said speech-degraded environment is a co-channel speech environment, further comprising:
   means for identifying a target speaker #1 and a non-target speaker #2 for each of said speech segments determined to be usable;
   means for inputting a set of top two choices for said speaker #1 and said speaker #2;
   means for deciding whether said speech segments determined to be usable are from said speaker #1 or from said speaker #2;
   means for sorting said speech segments determined to be usable into those associated with said speaker #1 and those associated with said speaker #2; and
   means for repeating the actions of said means for identifying, said means for inputting, said means for deciding, and said means for sorting.

23. Apparatus of claim 22, further comprising:
   means for extracting pitch and formants from abutting frames of said usable speech segments associated with said speaker #1 and said usable speech segments associated with said speaker #2;
   means for extending actions of said means for extracting pitch and formants backward and forward into abutting co-channel frames of said unusable speech segments associated with said speaker #1 and said unusable speech segments associated with said speaker #2; and
   means for reconstructing a complete utterance of speaker #1 and of speaker #2 from said abutting co-channel frames of said unusable speech.

24. Apparatus of claim 21 wherein said speech-degraded environment is a speech-plus-noise environment.

25. Apparatus of claim 21 wherein said speech-degraded environment is a multipath speech environment.

26. Apparatus of claim 21 wherein said speech-degraded environment is a quantization noise speech environment.

27. Apparatus of claim 21 wherein said speech-degraded environment is a finite bandwidth distortion speech environment.

28. Apparatus of claim 21 wherein said speech-degraded environment is an echo distortion speech environment.

* * * * *